June 29, 1954     P. I. SCHULTZ     2,682,262
SWINGABLE CUTTER CUTTING MACHINE

Filed Aug. 18, 1950     2 Sheets-Sheet 2

INVENTOR.
Paul I. Schultz
BY
Woodling & Krost
his attys.

Patented June 29, 1954

2,682,262

UNITED STATES PATENT OFFICE 2,682,262

SWINGABLE CUTTER CUTTING MACHINE

Paul I. Schultz, Cleveland, Ohio

Application August 18, 1950, Serial No. 180,164

17 Claims. (Cl. 125—13)

The invention relates to machines for cutting articles and especially to a machine having a circular cutter for cutting stone, tile, lumber and similar articles.

One of the objects of the invention is to provide a simple and inexpensive machine which may be easily moved from place to place and which is rugged and sturdy in construction.

Another object of the invention is to provide a cutting machine wherein the cutting blade is mounted for pivotal movement towards and away from the base of the machine with the weight of the cutting tool regulating the force of the tool against the object being cut.

Another object of the invention is to provide a machine having a base structure with a platform pivoted thereabove with an adjustment mechanism for raising and lowering the platform relative to the base.

Another object of the invention is to provide a set of levers operable to control the pivotal movement of the platform and thus the cutting tool towards the base of the machine.

Another object of the invention is to provide a machine wherein the platform which supports the cutting tool and motor rests on the base and is easily removed therefrom.

Another object of the invention is to provide a machine having a base with a platform thereabove with a platform raising and lowering mechanism and a platform pivot control mechanism wherein the pivot control mechanism is mounted in a fixed location on the machine and operates over a range of adjustments of the raising and lowering device.

Another object of the invention is to provide a machine having a base with a platform thereabove with a platform raising and lowering mechanism and a platform pivot control mechanism wherein the pivot control mechanism operates over a range of adjustments of the raising and lowering device.

Another object of the invention is to provide means for raising and lowering the platform without having to change linkages for reciprocating or pivoting the platform.

Another object of the invention is to provide the angularly pivotal platform with raising and lowering means and with pivot control means which operate within the same path regardless of the raising or lowering of the platform.

Other objects and a fuller understanding of this invention may be had by referring to the following description and claims, taken in conjunction with the accompanying drawings, in which:

Figure 1:
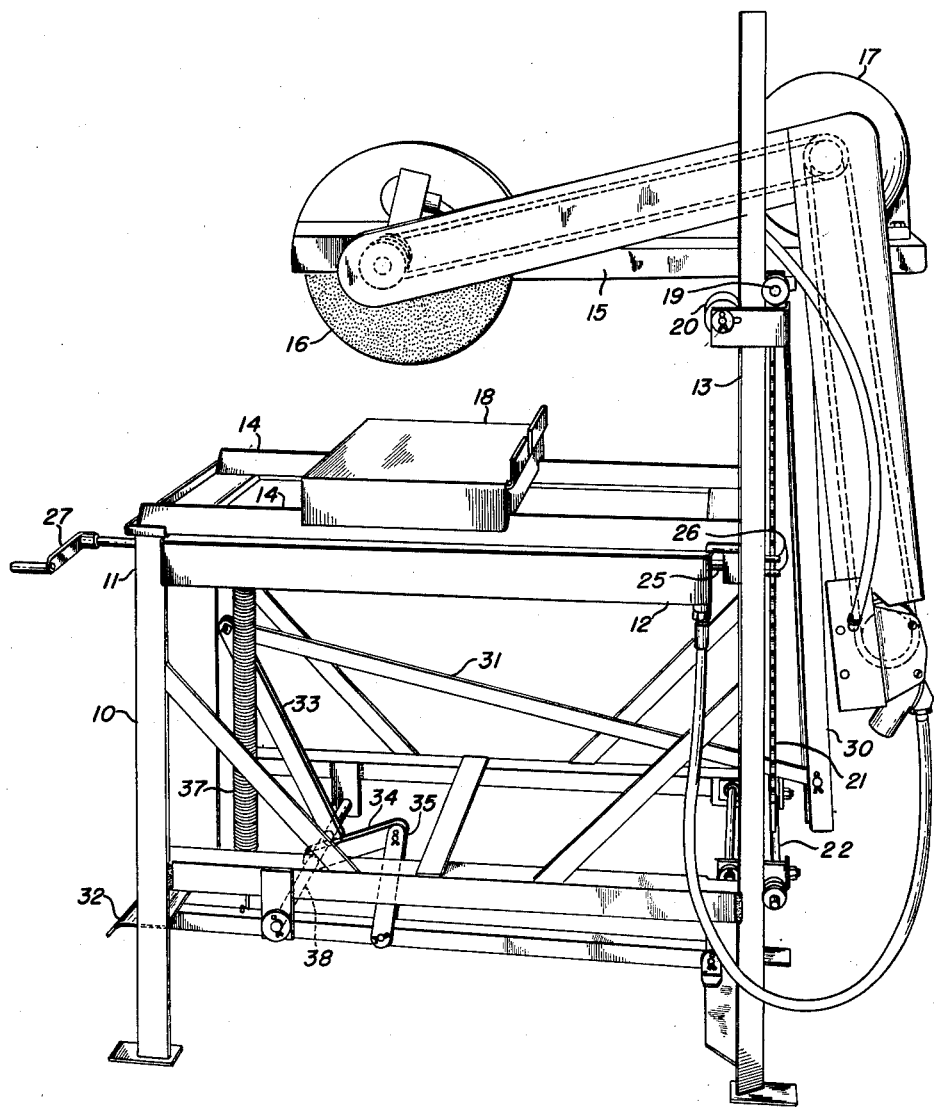
Figure 1 is a pictorial side view of the machine.
Figure 2:
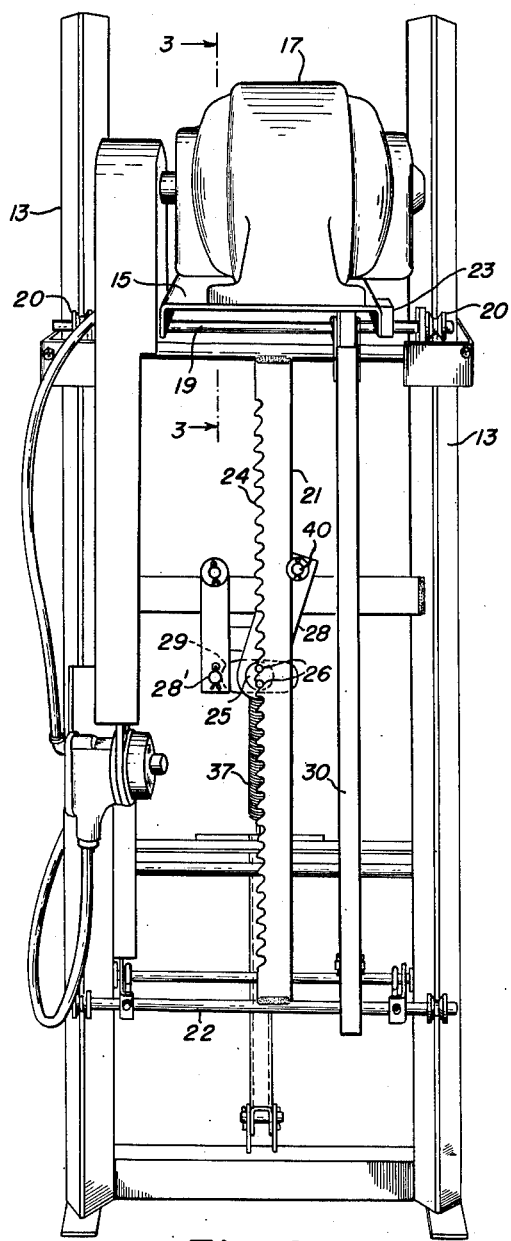
Figure 2 is a pictorial back view of the machine.

The machine illustrated and described in the drawings has been specially constructed for cutting stone, cinder block, tile and the like. However, it is understood that the same construction of the machine may be used for cutting wood or any other object which is to be cut with a cutting tool. It is also understood that the invention described and claimed herein may be applied to other machines having a platform pivotally mounted above a base.

In general, the machine comprises a base 10 having a front end 11 and a back end 12 and upright posts 13 pivotally supporting a platform 15. The base 10 may be constructed of a frame work of suitable members, such, for example, as angle irons welded together as illustrated in the drawings. The top of the base 10 is equipped with ways 14 extending from the front end 11 to the back end 12. In this instance, the upright posts 13 extend generally vertically from the ways 14 at the back end 12 of the base 10.

The platform 15 is carrying, in this instance, a rotary cutter blade 16 and its drive motor 17 and is pivotally mounted on the upright posts 13 for pivotal movement of the rotary cutter blade 16 towards and away from the base 10. The ways 14 support a carrier 18 for carrying a stone or other object to be cut by the rotary cutter blade 16 back and forth beneath the cutter blade 16.

To pivotally support the platform 15 by the upright posts 13, a crossbar 19 extends between the posts and is movable therealong in an up and down direction. On each end of this crossbar 19 is roller means 20 which rides on its respective post 13. Each roller means 20 preferably has a pair of rollers which are spaced apart to receive their post therebetween, thus holding the crossbar 19 on the posts 13. In this particular instance, the crossbar 19 is in the form of two rods, one on the front side of the posts 13 and carrying one set of rollers, and the other on the back side of the post carrying the other set of rollers. The two rods, however, are referred to herein as a crossbar. To support the crossbar 19, a rack 21 is fastened thereto and extends downwardly along the back side of the machine to a bottom guide 22 movable along the upright posts 13 to keep rack 21 in alignment with the posts 13. The platform 15 which rests on the crossbar 19 is provided with notched members 23 having spaced notches permitting adjustment of the overhanging of the blade end of the platform and thus adjustment of the gravitational force of the blade 16 on the workpiece.

The platform is raised and lowered by a manually turnable member 25 having spaced pins 26 and a cam 29 on one end thereof and a crank on the other end thereof. The rack 21 is provided with teeth 24 along one edge thereof for receiving the spaced pins 26. The turnable member 25 is turnably supported by a self-aligning part 28 loosely and movably mounted on the back end 12 of the base 10 and abuttable against the edge opposite the teeth 24 of the rack 21. The top end 40 of this alignment part 28 abuts the smooth edge of the rack 21 while at least one of the spaced pins 26 in the bottom end thereof engages the bottom edge of the teeth 24 on the opposite side of the rack at all times. Thus the weight of the platform and the rack 21 cause the pins 26 to remain in the teeth 24 of the rack and abut the end 40 against the back edge of the rack 21. By having the end 40 on one side of the rack and the pins 26 on the other side of the rack all side thrust in any direction, other than a vertical direction which side thrust may be caused by the weight on pins 26, is restricted within rack 21 and is not transferred to the remaining structure of the machine. Attached to the self-aligning part 28 is a member 28' maintained in a fixed position horizontally of the rack 21 and engageable by the cam 29 on the turnable member 25. The long dimension of the cam 29 is transverse to a line drawn between the spaced pins 26 so that the cam 29 abuts member 28' at all times so that either one of the pins or both of the pins are engaging the teeth 24.

To raise or lower the platform 15, the operator simply turns the crank 27 at the front end of the base 10 thereby moving the pins 26 along the teeth 24. Turning of the pins 26 to either raise or lower the rack causes a slight raising of the rack upon the initial movement of the pins, after which the rack is either further raised or lowered. After the platform has been raised or lowered, the weight on the rack 21 will move and lock both spaced pins 26 into engagement with the teeth 24 and move the end 40 against the back edge of the rack 21 to hold the platform at the desired height. The cam 29 prevents horizontal movement of the pins 26 out of the teeth 24 since it will abut fixed member 28'.

It has been found preferable to have the edge surfaces of the teeth 24 on the rack 21 slope downwardly and at an angle to the rack; by having the teeth sloping downwardly, grit and other waste does not settle on them. Each tooth also covers the one below it. Any dirt hitting the edge of the tooth will fall off, thus preventing clogging of the teeth and insuring smooth positive insertion of the pins 26 between and against the undersurface edge of the teeth.

The platform 15 pivotally rests on the crossbar 19 with the center of weight of the platform 15 in front of the upright posts and over top of the base 10 or between the front and back ends of the base 10. The platform 15 is normally pivotal through a limited angular pivotal movement which remains substantially uniform for the different elevational positions of the pivot axis of the crossbar above the carrier 18 on base 10. When the machine is moved from place to place, the platform 15 may be lifted from the base 10 and moved separately. In this way, the weight of the machine is divided and the machine is moved in two parts. The machine is easily reassembled by resting the platform 15 on the crossbar 19.

To prevent the cutting blade 16 from normally resting on the carrier 18, a control means such as the herein described lever arrangement or mechanism has been fastened in the base 10 and to the crossbar 19 carrying platform 15. This lever arrangement is arranged in such way that the operator may use his foot to permit the blade 16 to drop down or be lowered by its own weight onto an object resting on the carrier 18. Thus, any cutting of the object will be totally controlled by the unbalanced weight of the platform 15 which causes the platform to pivot downwardly about the crossbar 19. The blade may also be lowered by hand and without use of the foot pedal. If the platform is provided with a member 23 having several notches, the distance between the pivot axis of the platform and the center of weight of the platform may be changed to change the force or pressure of the cutter on the object being cut.

This lever mechanism comprises a first lever arm 30 pivoted at the top end thereof to the crossbar 19 and extending downwardly along the back of the machine in general alignment with the upright posts 13. At the bottom end of this first lever arm 30 is a link 31 which is pivotally connected thereto and extends generally horizontally to the front end 11 of the base 10. Both this lever arm 30 and link 31 are long and the link 31 is moved generally longitudinally to pivotally move the first lever arm about the crossbar 19. The link 31 is mounted in such manner that the front end thereof does not have to be raised or lowered when lever arm 30 is raised or lowered. The lengths of lever arm 30 and link 31 are sufficient to maintain substantially uniform pivotal movement of lever arm 30 and crossbar 19 upon general longitudinal horizontal movement of link 31 even though crossbar 19 is raised or lowered.

The link 31 may be moved in a generally horizontal movement by any suitable means. However, to enable an operator to use both hands in manipulating material being cut, it is desirable to have the link 31 foot operated. A foot pedal 32 at the front of the machine is interconnected by bell crank lever 33, 34 and link 35 to the front end of the link 31 to effect a generally longitudinal movement of the link 31 upon pressing down of the foot pedal. The interconnected arms of the bell crank 33, 34 are secured relative to each other by a rod 38 journalled in a fixed location in the framework of the base 10 between the foot pedal 32 and the generally horizontal link 31. This lever mechanism is designed whereby pressing down of the foot pedal moves the link 31 longitudinally towards the back end of the machine, thus pivoting the bottom end of the first lever arm 30 away from the back end of the base 10.

Figure 3:
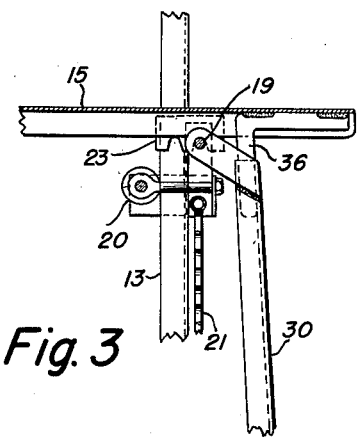
Figure 3 is a fragmentary sectional view along the line 3—3 of Figure 2.

As is best illustrated in the fragmentary view of Figure 3 of the drawings, the first lever arm 30 is preferably of a U-shaped channel and the platform 15 is provided with a downwardly extending abutment pin or means 36. This abutment pin 36 is welded or otherwise secured to the underside of the platform 15 and extends down into the top end of the channeled first lever arm 30. Thus, when the bottom end of the first lever arm is pivoted away from the base, the platform 15 is allowed to pivot to drop the cutter towards the carrier 18. A spring 37 interconnected between the base 10 and the foot pedal 32 normally holds the foot pedal in the top position and exerts a force through the levers restraining downward pivotal movement of the platform. Since the spring 37 holds the bottom end of the first lever arm against the back end of the base and the abutment means 36 abuts against this first lever arm, the cutting blade cannot drop towards the carrier 18 until the force of the spring is overcome by the operator. The spring normally holds the cutter blade 16 above the carrier 18 on the ways 15. To lower the cutting blade 16 into an object on the carrier 18, the operator simply presses the foot pedal 32.

The movement of the foot pedal 32 is limited by the floor on which the machine rests for the lower limit, and the upper limit is effected by the lower end of lever arm 30 striking the bottom guide 22. This arcuate movement of the foot pedal 32 imparts a similar arcuate movement to the platform 15. The lower limit of movement of the cutting wheel 16 is effected by the foot pedal 32 striking the floor. The foot pedal operated upper limit of the cutting wheel 16 is effected by the lower end of lever arm 30 striking the bottom guide 22. Actually, the cutting wheel 16 may be elevated still higher, by hand or by the action of a workpiece passing under the cutting wheel. Under such conditions, the abutment pin 36 will swing forward out of contact with the lever arm 30. The actual upper limit of the cutting wheel 16 is thus when the abutment pin 36 strikes the crossbar 19.

Figure 4:
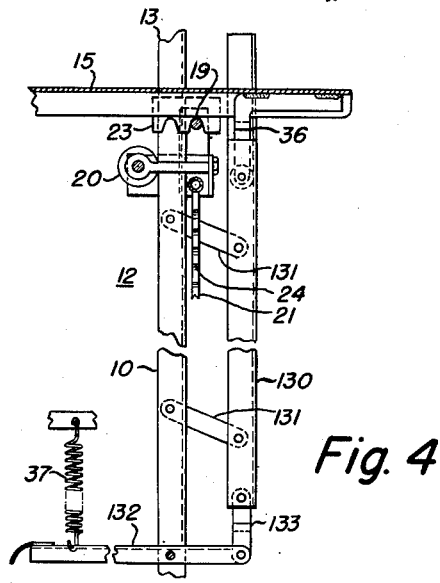
Figure 4 illustrates a modification of the invention.

In Figure 4 of the drawings is illustrated a modification of the invention. The main part of this modification is in the arrangement of the levers and foot pedal for permitting the platform to drop towards the table on the base. The same platform and base is used in this modification as the preferred embodiment of the invention. A vertical member 130 is movably linked to the back end 12 of the base 10 by links 131. This vertical member 130, which is pivoted on the links 131 which are pivoted to the back posts 13 at the back end 12, is movable in an upward and outward movement. The arm 36 mounted on the platform 15 abuts this vertical member 130. When the vertical member is moved away from the upright posts 13, the platform 15 is allowed to pivotally drop or move towards the carrier 18 on the base of the machine.

A foot pedal lever 132 pivoted between the upright posts 13 extends to the front of the machine for depressing by the foot of the operator. A connecting link 133 interconnects the end of this foot pedal lever 132 and the lower end of the vertical member 130. When the operator presses down on the front end of the foot pedal lever 132, the vertical member 130 is urged in an upward and outward movement relative to the uprights posts 13 thereby permitting the platform to pivot and move the saw blade 16 into the work on carrier 18.

It is noted that in the preferred embodiment of the invention, as well as in the modification in Figure 4, the platform 15 is pivotal through a limited range of angular movement on an axis positionable at any one of many elevational positions above the base 10. It is also noted that the foot pedal 32 is pivoted on a stationary pivot relative to the base so that the foot pedal moves up and down or from a first point to a second point in a range of movement. This range of movement of the foot pedal should remain in the same place regardless of how high the platform has been raised to position the blade for cutting thick and thin material carried on the carrier 18. This design also maintains the pivotal movement of the swinging of the blade 16 up and down relative to the work in about the same range of movement for cutting either thick or thin work or material.

The range of pivotal movement or swing of the blade is maintained substantially uniform and the range of movement of the foot pedal is maintained in the same position relative to the base for all of the different heights or elevational positions of the platform by using the interconnected levers or links which have fixed dimensions and operatively connect the foot pedal control means and the platform. The dimensions of the levers are not changed since they are fixed when the platform is raised or lowered relative to the work carrier riding on top of the base.

Another feature of the present invention is that the cutter blade may be operated to cut to a desired depth in material without the use of the foot pedal. The foot pedal may be positioned so that the blade would drop towards the carrier or angularly pivot to the bottom of its range of angular movement. The whole platform including the pivot axis is then raised to the correct elevated position above the base so that the blade will only move by gravity to a certain distance from the carrier. Workpieces of material to be cut may be placed on the carrier and shoved beneath the blade. As the work starts under the blade, it will tend to raise the blade and thus floatingly support the blade until the blade has cut into the work to the desired depth. Thus with the present design, the cutting blade at all times moves against the workpiece according to the gravitational overhanging of the platform which causes the angular movement of the platform and thereby movement of the cutting blade towards the workpiece carrier.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a machine, a base structure having a front end and a back end with upright posts at the back end thereof, a crossbar extending between said posts and vertically movable therealong, a rack fastened to said crossbar and extending downwardly between said posts, a manually operable member including a pair of spaced pins turnably mounted in said base structure with the pins engageable with the rack for moving the crossbar along the posts, a lever arm pivoted at one end on said crossbar and extending generally downwardly between said posts, a link pivoted to the lever arm and extending generally horizontally towards the front end of said base, a platform resting on said crossbar with the center of weight of said platform over said base and between the ends thereof, said platform including pivot control means abuttable by said lever arm, a foot pedal operatively connected to said link in the region of the front end of said base to longitudinally move said link and thereby pivot the lever arm, the operating lengths of said lever and link remaining the same for all positions of said crossbar, and a spring connected between said base and said foot pedal and exerting a force through said lever and link restraining pivotal movement of said platform.

2. In a machine having a base structure with spaced upright posts, a horizontal means pivotally mounted between said posts with the pivot vertically movable therealong, a first lever arm fastened at one end to said horizontal means and extending downwardly therefrom, a link fastened to the other end of said first lever arm and extending generally horizontally therefrom, said link terminating at a distance from said first lever arm and movable generally longitudinally to move said first lever arm and thereby control pivoting of said horizontal means, said lever arm and link having constant operating lengths sufficient to maintain substantially uniform pivotal movement of said horizontal means when the same has been vertically moved along the posts.

3. In a machine, a base structure having a front end and a back end with upright posts at the back end thereof, a crossbar extending between said posts and vertically movable therealong, a rack fastened to said crossbar and extending downwardly therefrom, a member including a pair of spaced pins turnably mounted in said base structure with the pins engageable with the rack for moving the crossbar along the posts, an alignment part on said back end of said base structure, and a cam on said member engageable with said alignment part to hold said pins in engagement with said rack.

4. In a machine, a base structure having a front end and a back end with upright posts at the back end thereof, a crossbar extending between said posts and vertically movable therealong, a rack fastened to said crossbar and extending downwardly therefrom, a member including a pair of spaced pins turnably mounted in said base structure with the pins engageable with the rack for moving the crossbar along the posts, a platform resting on said crossbar with the center of weight of said platform over said base and between the ends thereof, said platform including pivot control means, an alignment part on said back end of said base structure, a cam on said member engageable with said alignment part to hold said pins in engagement with said rack, a substantially vertical member movably linked to the back end of said base structure and abuttable against said control means to limit pivotal movement of said pivot control means, a horizontal lever pivoted in said base for manual movement, a link interconnecting said lever and said vertical member, and a spring interconnected between said base structure and said lever and restraining movement of said vertical member in an upward and outward movement from said base structure thereby restraining pivotal movement of said platform.

5. In a machine having a work supporting base, a platform pivotal through a limited range of angular movement on an axis positionable at any one of many elevational positions above said base, means for raising and lowering said platform to move the pivotal axis thereof from one elevational position to another elevational position, control means mounted on said base and movable in a range of movement between a first point and a second point, and interconnected long members generally mutually perpendicular having fixed operative dimensions and operatively connecting said control means and said platform whereby said control means controls the angular pivoting of said platform through said limited range of angular movement when the pivot axis thereof is in any one of said elevational positions, said platform establishing the same initial angular position relative to the horizontal for all elevational positions of said pivotal axis for any given initial position of said control means, said long members retaining the same operative dimensions for all elevational positions of said pivotal axis and keeping the range of movement of the control means substantially between said first and second points without varying said dimensions.

6. A machine having a base, columns on said base, bearing means carried by said columns, adjustment means to change the position of said bearing means on said columns, a tiltable operating device journaled on said bearing means for arcuate movement relative to said base, the center of gravity of the entire tiltable operating device being on one side of said bearing means to thus urge said operating device toward said base in a given direction, a lever having first and second ends with the first end pivoted to said machine and adjustably movable with said bearing means, abutment means interconnecting said lever and said tiltable operating device at least under the action of gravity acting upon said tiltable operative device, a long member having one end thereof pivoted to the second end of said lever, and disposed generally perpendicular to said lever, resilient means acting through said long member, lever and abutment means to resist the force of gravity on said tiltable operating device, and means to move said long member generally longitudinally and stressing said resilient means to control the arcuate movement of said tiltable operating device.

7. A machine having a base, front and rear legs on said base, a horizontal platform on said base, rear columns extending vertically above said horizontal platform, horizontal bearing means carried by said rear columns, a tiltable platform journaled on said bearing means for arcuate movement, an operating device carried on the forward end of said tilting platform arranged to have an up and down arcuate movement above and relative to said horizontal platform, the center of gravity of the entire tiltable platform being forward of said bearing means to thus urge said operating device toward said horizontal platform, adjustment means to raise and lower said bearing means on said rear columns, a lever having first and second ends with the first end pivoted to said bearing means and elevatable therewith, abutment means interconnecting said lever and said tiltable platform at least under the action of gravity acting upon said tiltable platform, an operating member having one end thereof pivoted to the second end of said lever and disposed generally perpendicular to said lever, and means to move said operating member generally longitudinally to tilt said tiltable platform, said adjustment means being operable while retaining said tiltable platform, lever and operating member in continual operative engagement and while maintaining said operating member generally perpendicular to said lever.

8. A machine having a base, front and rear legs on said base, a horizontal platform on said base, rear columns extending vertically above said horizontal platform, horizontal bearing means carried by said rear columns, a tiltable platform journaled on said bearing means for arcuate movement, an operating member carried on the forward end of said tilting platform arranged to have an up and down arcuate movement above and relative to said horizontal platform, the center of gravity of the entire tiltable platform being forward of said bearing means to thus urge said operating member toward said horizontal platform, a generally vertical member pivoted to said machine, abutment means interconnecting said vertical member and said tiltable platform at least under the action of gravity acting upon said tiltable platform, a generally horizontal member pivoted to the lower end of said vertical member to move same in an upward and outward direction and thus control the tilting of said tiltable platform, and adjustment means to raise and lower said bearing means on said rear columns while retaining said tiltable platform and horizontal and vertical members in continual operative engagement.

9. A machine having a base, front and rear legs on said base, a horizontal platform on said base, rear columns extending vertically above said horizontal platform, horizontal bearing means carried by said rear columns, a tiltable platform journaled on said bearing means for arcuate movement, an operating member carried on the forward end of said tilting platform arranged to have an up and down arcuate movement above and relative to said horizontal platform, the center of gravity of the entire tiltable platform being forward of said bearing means to thus urge said operating member toward said horizontal platform, a generally vertical lever pivoted to and depending from said bearing means, abutment means interconnecting said lever and said tiltable platform at least under the action of gravity acting upon said tiltable platform, a long generally horizontal link having the rear end thereof pivoted to the lower end of said lever, lever means to move the forward end of said link throughout a short arc a tangent to which is generally horizontal, resilient means urging said link forward and thus supporting said tiltable platform against the force of gravity, and adjustment means to raise and lower said bearing means on said rear columns while retaining said tiltable platform, lever and link in continual operative engagement and while maintaining said link substantially horizontal.

10. In a swingable cutter cutting machine having a work supporting base, an operating head platform pivotal through a limited range of angular movement on an axis positionable at any one of many elevational positions above said base, means for raising and lowering said platform to move the pivotal axis thereof from one elevational position to another elevational position, control means mounted on said base and movable in a range of movement between a first point and a second point, and interconnected members generally mutually perpendicular having fixed operative dimensions, one of said members being long and both members operatively connecting said control means and said platform whereby said control means controls the angular pivoting of said platform through said limited range of angular movement when the pivot axis thereof is in any one of said elevational positions, said platform establishing the same initial angular position relative to the horizontal for all elevational positions of said pivotal axis for any given initial position of said control means, said members retaining the same operative dimensions for all elevational positions of said pivotal axis and keeping the range of movement of the control means substantially between said first and second points without varying said dimensions.

11. A machine having a base, generally horizontal bearing means carried by said base, a tiltable platform journaled on said bearing means for arcuate movement, an operating member carried on the forward end of said tilting platform arranged to have an up and down arcuate movement relative to said base, means to urge said operating member toward said base, a generally vertical member pivotally carried by said machine, abutment means interconnecting said vertical member and said tiltable platform at least under the action of said urging means acting upon said tiltable platform, a generally horizontal lever pivoted to said base and connected to the lower end of said vertical member to move same in an outward direction and thus control the tilting of said tiltable platform, and adjustment means to raise and lower said bearing means on said rear columns while retaining said tiltable platform and horizontal lever and vertical member in continual operative engagement.

12. A machine having a base, generally horizontal bearing means carried by said base, a tiltable platform journaled on said bearing means for arcuate movement, an operating member carried on the forward end of said tilting platform arranged to have an up and down arcuate movement relative to said base, means to urge said operating member toward said base, a generally vertical member pivotally carried by said machine, abutment means interconnecting said vertical member and said tiltable platform at least under the action of said urging means acting upon said tiltable platform, a generally horizontal member pivoted to the lower end of said vertical member to move same in an upward and outward direction and thus control the tilting of said tiltable platform, and adjustment means to raise and lower said bearing means on said rear columns while retaining said tiltable platform and horizontal and vertical members in continual operative engagement.

13. In a machine having a base, pivot means vertically movable on said base, a platform pivotally carried on said pivot means, means to urge said platform in a given pivotal direction on said pivot means, a substantially vertical member having one end thereof movably linked to said machine near said pivot means, said platform including pivot control means pivoting with said platform and abuttable against said vertical member under the action of said urging means to limit pivotal movement of said platform in said given pivotal direction, a substantially horizontal link carried on said base and disposed for manual movement and connected to the opposite end of said vertical member to move same outwardly from said base, and a spring interconnecting said base and said link and restraining movement of said vertical member thereby restraining pivotal movement of said platform in said given pivotal direction, said horizontal link being long relative to the vertical movement of said pivot means to thereby cause said platform to remain at substantially the same angle relative to said machine for different vertical positions of said pivot means and platform.

14. In a machine having a base, pivot means vertically movable on said base, a platform pivotally carried on said pivot means, means to urge said platform in a given pivotal direction on said pivot means, a substantially vertical member having one end thereof linked to said platform near said pivot means and vertically movable therewith to control pivotal movement of said platform, a substantially horizontal link carried on said base and disposed for manual movement and connected to the opposite end of said vertical member to pivot same and hence pivot said platform, said horizontal link being long relative to the vertical movement of said pivot means and vertical member to thereby cause said platform to remain at substantially the same angle relative to said machine for different vertical positions of said pivot means, vertical member, and platform yet retaining the same operating lengths of said vertical member and link.

15. In a swingable cutter cutting machine having a base, pivot means mounted on said base to be adjusted to at least two selected positions with the pivotal axis in both positions lying substantially in a single plane, cutter head supporting lever means supported by said pivot means transversely to said pivot means, a motion transferring member, a first portion of said motion transferring member movably mounted on said base, said lever means and said motion transferring member engaging each other at an interengaging point, the interengaging point being located at a fixed radial distance from said axis and in a manner that the projection of the interengaging point on said plane is at a substantial distance from said pivot axis, control means arranged to impart motion to said motion transferring member to move said interengaging point and hence move said lever means, tangential direction of said motion about said pivot axis at said interengaging point being generally transverse to said plane, said motion transferring member being arranged so that said interengaging point remains at substantially the same distance from said plane for either of said selected positions of said pivot means for any given initial location of said first portion of said motion transferring member, said interengaging point being free to follow the positional movement of said axis so that the distance between the projection of the interengaging point on the plane and the axis remains substantially the same for both of said selected positions of the axis for any given single location of said first portion of said motion transferring member.

16. In a swingable cutter cutting machine having a base, pivot means mounted on said base to be adjusted to at least two selected positions with the pivotal axis in both positions lying substantially in a single plane, cutter head supporting lever means supported by said pivot means transversely to said pivot, a motion transferring link, control means arranged to impart longitudinal motion to said link, a first portion of said link movably mounted on said base, a second portion of said link pivotally engaged to said lever means at an interengaging point, said link being generally transverse to said plane, the distance between said first and said second portions of said link being relatively long, and said interengaging point being located at a fixed radial distance from said axis and in a manner that the projection of the point on said plane is at a substantial distance from said axis.

17. In a swingable cutter cutting machine having a base, pivot means mounted on said base to be adjusted to at least two selected positions with the pivotal axis in both positions lying substantially in a reference plane, a cutter head supporting lever member supported by said pivot means transversely to said pivot, a motion transferring member having a plane surface lying substantially parallel to said reference plane and being movably mounted to said base in a manner so that the plane surface is movable to and from said reference plane and remains substantially parallel to said reference plane, said cutter head supporting lever member having an engaging portion engaging the plane surface of the motion transferring member at an interengaging point, said point being located at a fixed radial distance from said axis and in a manner that the projection of the point on said reference plane is at a substantial distance from said axis, and control means arranged to impart motion to said motion transferring member to move said interengaging point and hence said lever member.

References Cited in the file of this patent

UNITED STATES PATENTS

| Number | Name | Date |
|---|---|---|
| 858,716 | Gilchrist | July 2, 1907 |
| 1,785,373 | Willette | Dec. 16, 1930 |
| 2,171,024 | Coates | Aug. 29, 1939 |
| 2,180,743 | Martin | Nov. 21, 1939 |
| 2,247,183 | Bour | June 24, 1941 |